US011384025B2

(12) United States Patent
Sandhage et al.

(10) Patent No.: US 11,384,025 B2
(45) Date of Patent: Jul. 12, 2022

(54) CERAMIC AND CERAMIC COMPOSITE COMPONENTS

(71) Applicant: Purdue Research Foundation, West Lafayette, IN (US)

(72) Inventors: Kenneth Henry Sandhage, West Lafayette, IN (US); Asegun Sekou Henry, Atlanta, GA (US)

(73) Assignee: Purdue Research Foundation, West Lafayette, IN (US)

( * ) Notice: Subject to any disclaimer, the term of this patent is extended or adjusted under 35 U.S.C. 154(b) by 222 days.

(21) Appl. No.: 16/094,262

(22) PCT Filed: Apr. 18, 2017

(86) PCT No.: PCT/US2017/028091
§ 371 (c)(1),
(2) Date: Oct. 17, 2018

(87) PCT Pub. No.: WO2017/184580
PCT Pub. Date: Oct. 26, 2017

(65) Prior Publication Data
US 2019/0127281 A1 May 2, 2019

Related U.S. Application Data

(60) Provisional application No. 62/324,063, filed on Apr. 18, 2016.

(51) Int. Cl.
*C04B 41/51* (2006.01)
*C04B 35/01* (2006.01)
(Continued)

(52) U.S. Cl.
CPC ........ *C04B 35/5622* (2013.01); *C04B 35/547* (2013.01); *C04B 35/56* (2013.01);
(Continued)

(58) Field of Classification Search
CPC ......... C04B 38/00; C04B 35/56; C04B 41/88; C04B 41/51; B32B 3/30; B32B 3/26;
(Continued)

(56) References Cited

U.S. PATENT DOCUMENTS 4,784,313 A * 11/1988 Godziemba-Maliszewski ............
B23K 35/001
228/124.1
6,598,656 B1   7/2003 Sandhage et al.
(Continued)

FOREIGN PATENT DOCUMENTS

EP      2 980 522 A1    2/2016

OTHER PUBLICATIONS

International Preliminary Report on Patentability for International Application No. PCT/US2017/028091, dated Oct. 23, 2018, (13 pages).

*Primary Examiner* — Joanna Pleszczynska
(74) *Attorney, Agent, or Firm* — Hartman Global IP Law; Gary M. Hartman; Domenica N. S. Hartman

(57) ABSTRACT

Thermally-conductive ceramic and ceramic composite components suitable for high temperature applications, systems having such components, and methods of manufacturing such components. The thermally-conductive components are formed by a displacive compensation of porosity (DCP) process and are suitable for use at operating temperatures above 600° C. without a significant reduction in thermal and mechanical properties.

14 Claims, 12 Drawing Sheets

(51) Int. Cl.
| | |
|---|---|
| C04B 35/547 | (2006.01) |
| C04B 41/88 | (2006.01) |
| B32B 3/30 | (2006.01) |
| B32B 3/26 | (2006.01) |
| B32B 18/00 | (2006.01) |
| F28F 3/00 | (2006.01) |
| F28F 3/04 | (2006.01) |
| F28F 3/12 | (2006.01) |
| C04B 35/56 | (2006.01) |
| C04B 37/00 | (2006.01) |
| C04B 41/00 | (2006.01) |
| C22C 1/10 | (2006.01) |
| C22C 29/06 | (2006.01) |
| C04B 38/00 | (2006.01) |
| C04B 35/58 | (2006.01) |
| C04B 35/76 | (2006.01) |
| F03G 6/06 | (2006.01) |
| F24S 80/10 | (2018.01) |
| C04B 35/632 | (2006.01) |
| C04B 35/638 | (2006.01) |
| C04B 35/657 | (2006.01) |
| C04B 41/50 | (2006.01) |
| C04B 41/87 | (2006.01) |
| C09K 5/14 | (2006.01) |
| C22C 29/08 | (2006.01) |

(52) U.S. Cl.
CPC ............ *C04B 35/58* (2013.01); *C04B 35/632* (2013.01); *C04B 35/638* (2013.01); *C04B 35/657* (2013.01); *C04B 35/76* (2013.01); *C04B 37/001* (2013.01); *C04B 37/003* (2013.01); *C04B 38/00* (2013.01); *C04B 41/009* (2013.01); *C04B 41/5025* (2013.01); *C04B 41/51* (2013.01); *C04B 41/5133* (2013.01); *C04B 41/87* (2013.01); *C04B 41/88* (2013.01); *C09K 5/14* (2013.01); *C22C 1/1036* (2013.01); *C22C 29/06* (2013.01); *C22C 29/067* (2013.01); *C22C 29/08* (2013.01); *F03G 6/06* (2013.01); *F24S 80/10* (2018.05); *C04B 2235/3839* (2013.01); *C04B 2235/3847* (2013.01); *C04B 2235/40* (2013.01); *C04B 2235/404* (2013.01); *C04B 2235/405* (2013.01); *C04B 2235/407* (2013.01); *C04B 2235/428* (2013.01); *C04B 2235/604* (2013.01); *C04B 2235/616* (2013.01); *C04B 2235/6562* (2013.01); *C04B 2235/6583* (2013.01); *C04B 2235/77* (2013.01); *C04B 2235/96* (2013.01); *C04B 2235/9607* (2013.01); *C04B 2237/36* (2013.01); *C04B 2237/365* (2013.01); *C04B 2237/366* (2013.01); *C04B 2237/368* (2013.01); *C04B 2237/38* (2013.01); *C04B 2237/40* (2013.01); *C04B 2237/60* (2013.01); *C04B 2237/61* (2013.01); *C04B 2237/62* (2013.01); *Y02E 10/46* (2013.01)

(58) Field of Classification Search
CPC .... B32B 7/04; B32B 18/00; F28F 3/00; F28F 3/048; F28F 3/08; F28F 3/12; F28F 9/02; F28F 19/02; F28F 19/04; F28F 19/06; F28D 9/0031

See application file for complete search history.

(56) References Cited

U.S. PATENT DOCUMENTS

| | | | |
|---|---|---|---|
| 2009/0211977 A1* | 8/2009 | Miller | ................... F28D 9/0037 210/646 |
| 2011/0274596 A1* | 11/2011 | Moon | ................. B01J 19/0093 422/600 |

* cited by examiner

CERAMIC AND CERAMIC COMPOSITE COMPONENTS

BACKGROUND OF THE INVENTION

The present invention generally relates to high temperature components. The invention particularly relates to thermally-conductive ceramic and ceramic composite components capable of use in high temperature systems.

Diffusion-bonded heat exchangers are highly robust, highly compact, plate-type heat exchangers used in, for example, high-temperature energy systems such as concentrated solar power (CSP) systems. Due to their construction, diffusion-bonded heat exchangers are particularly well-suited for high pressure, high temperature applications more traditionally serviced by shell and tube heat exchangers, but in a much more compact and higher integrity unit. Briefly, diffusion-bonded heat exchangers include an array of thermally-conductive pattern-etched metallic alloy plates which are stacked and diffusion bonded, for example, as represented in FIG. 1. Due to material limitations of the metallic alloys (for example, Ni-based alloys or stainless steels) used to form such plates, these systems are ordinarily limited to operating temperatures below about 600° C. Above this temperature, the metallic alloys may experience dramatic decreases in their mechanical properties, as represented in FIG. 2.

Accordingly, there is a desire for thermally-conductive components (including, but not limited to, heat exchangers) that are thermally-robust, mechanically-robust, chemically-robust, and capable of being used in high pressure, high temperature systems at operating temperatures above 600° C. without a significant loss of thermal conductivity, stiffness, strength, or corrosion-resistance.

BRIEF DESCRIPTION OF THE INVENTION

The present invention generally provides thermally-conductive ceramic and ceramic composite components suitable for high temperature applications, methods of manufacturing such components, and systems comprising such components.

According to one aspect, a thermally-conductive ceramic or ceramic composite component is provided that is suitable for use in high temperature systems. The component is prepared by a method comprising reacting a fluid comprising at least one displacing metal with a preform that has a pore volume and comprises at least one ceramic volume comprised of a displaceable species capable of being displaced by the displacing metal to produce at least one ceramic reaction product volume. The fluid is allowed to infiltrate the preform and react with the preform such that the displacing metal at least partially replaces the displaceable species to produce the at least one ceramic reaction product volume, the pore volume is at least partially filled by the at least one ceramic reaction product volume, and the ceramic or ceramic composite component is produced to comprise a ceramic reaction product volume portion having a volume greater than the volume lost by reaction of the ceramic volume from which the displaceable species was displaced. The thermally conductive ceramic or ceramic composite component is more thermally conductive than the preform with the pore volume.

Other aspects of the invention include methods of producing such components and systems in which such a component is installed.

Technical aspects of components, methods, and systems described above preferably include the capability of producing thermally-conductive components capable of operating at temperatures above 600° C. without a significant reduction in thermal, chemical, or mechanical properties. Such thermal properties include thermal conductivity. Such chemical properties include corrosion resistance. Such mechanical properties include the stiffness, fracture strength, and fracture toughness.

Other aspects and advantages of this invention will be further appreciated from the following detailed description.

DETAILED DESCRIPTION OF THE INVENTION

The present invention generally provides thermally-conductive ceramic and ceramic composite components suitable for high-temperature applications, methods of manufacturing such components, and high-temperature systems comprising such components. High-temperature systems of particular interest include, but are not limited to, systems for transportation, energy (e.g., electrical power) production, energy storage, waste heat recovery, propulsion, national defense, chemical processing, and chemical and waste storage. Notable transportation systems include, but are not limited to, systems for automobiles, trucks, trains, aircraft, spacecraft, ships, and submarines. Notable electrical power production systems include, but are not limited to, systems for fossil fuel-derived power, solar energy-derived power, nuclear energy-derived power, and thermionics. Notable energy storage systems include, but are not limited to, systems for the storage of solids, liquids, gases, or plasmas. Notable propulsion systems include, but are not limited to, systems for chemical fuel-based propulsion, nuclear fuel-based propulsion, and ion propulsion. Notable national defense systems include, but are not limited to, systems for hypersonic aircraft and hypersonic missiles. Notable thermally-conductive ceramic and ceramic composite components suitable for use in such high temperature systems include, but are not limited to, heat exchangers, piping, valves, pumps, bearings, heat sinks, liquid metal handling equipment, leading edges of hypersonic aircraft and missiles, and energy conversion devices. According to a nonlimiting aspect of the invention, such thermally-conductive components may be manufactured to be near-net shape and near-net size, and exhibit desirable properties for such applications, which may include high thermal conductivity, high melting temperatures, high stiffness, high corrosion resistance, and intricate shapes.

A particular but nonlimiting example of a high temperature application capable of using a ceramic or ceramic composite component within the scope of the invention comprises a heat exchanger in an advanced power generation cycle, such as a supercritical $CO_2$ ($scCO_2$) Brayton cycle or a high temperature noble gas Brayton cycle, for application in and/or with other components included within an electric power generation system. Certain components of such heat exchangers preferably are thermally-conductive, relatively stiff, mechanically robust, and corrosion resistant. Replacing such components with ceramic or ceramic composite materials as described herein is capable of promoting the operation of the heat exchangers at higher temperatures than would ordinarily be possible with conventional metal alloys. Consequently, higher efficiencies for generating electricity can be achieved with a lower cost of generated electricity.

Figure 1:
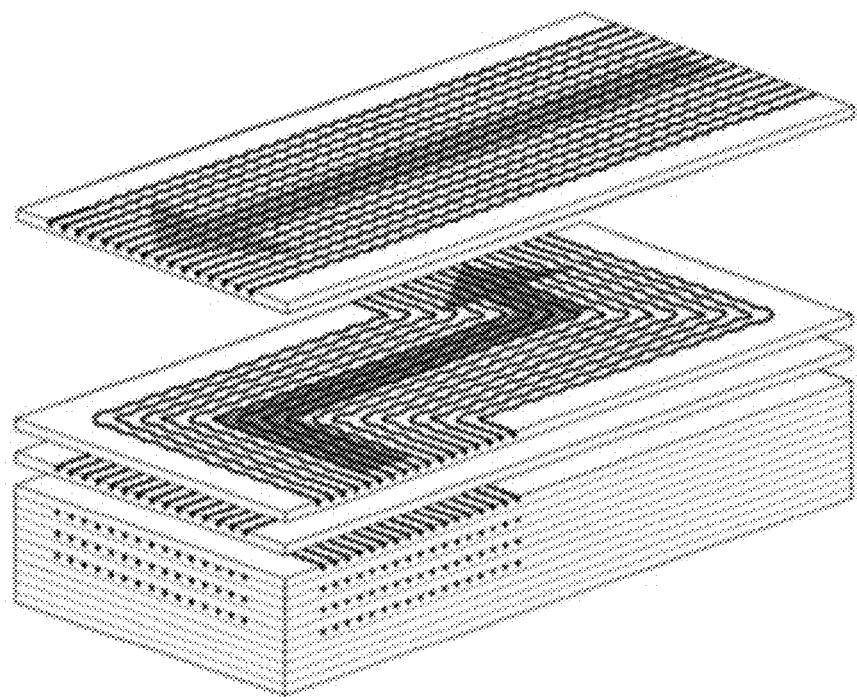
FIG. 1 schematically represents a partially-exploded perspective view of an array of thermally-conductive, pattern-etched, metallic alloy plates which are stacked and diffusion bonded to form components of a diffusion-bonded heat exchanger. Individual plates of the array comprise surface channels formed therein having alternating flow paths indicated by arrows. (From D. Southall, S. J. Dewson, *Proc. ICAPP '10*, San Diego, Calif., 2010; R. Le Pierres, et al., *Proc. $SCO_2$ Power Cycle Symposium* 2011, Boulder, Colo., 2011; D. Southall, et al., *Proc. ICAPP '08*, Anaheim, Calif., 2008).
Figure 2:
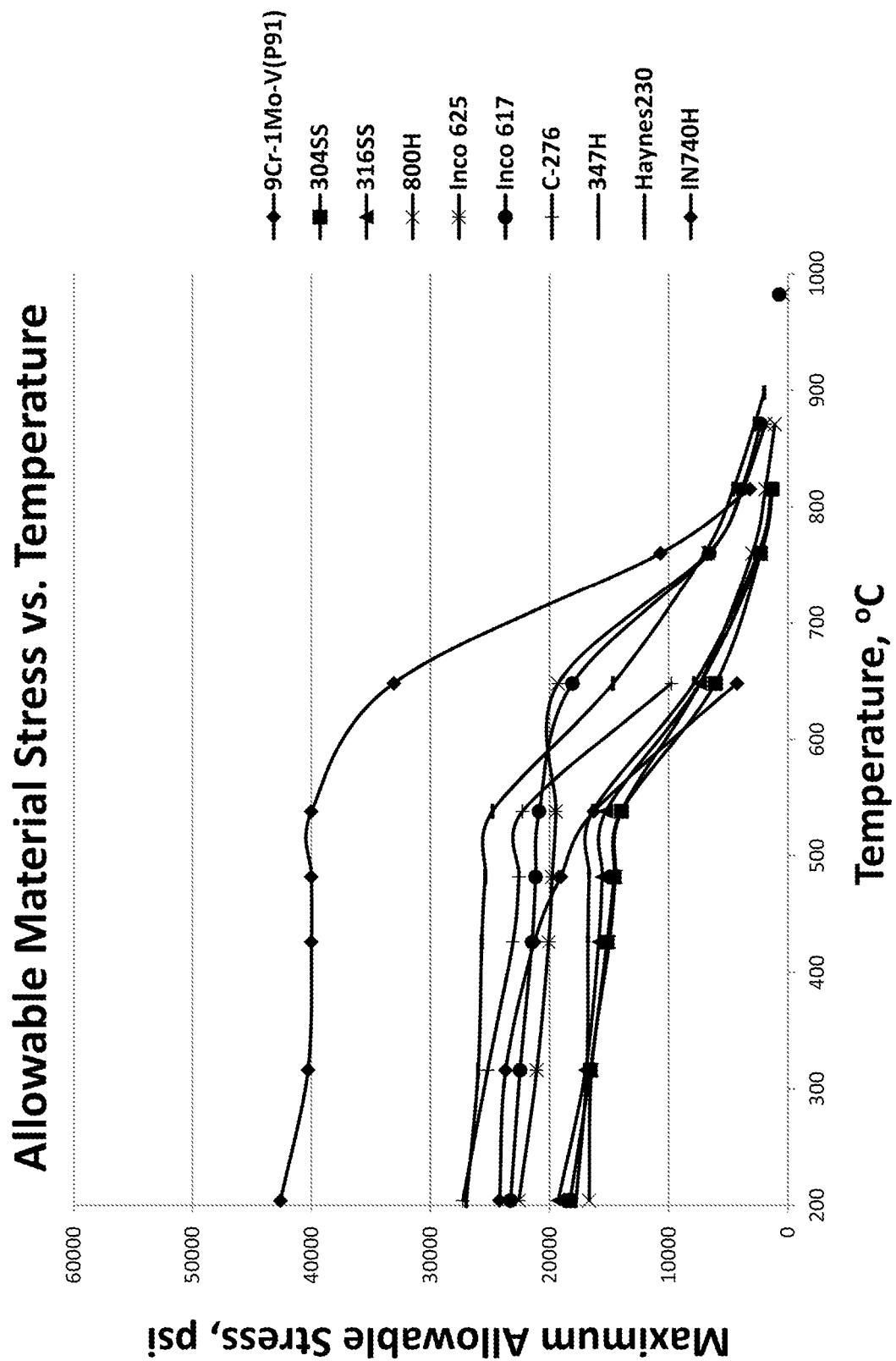
FIG. 2 is a graph representing the maximum allowable stress of various metallic alloys (e.g., 9Cr-1Mo-V(P91), 304 stainless steel (SS), 316 stainless steel (SS), 800 H, etc.) relative to temperature. As represented, these alloys experience dramatic decreases in their maximum allowable stress values at elevated temperatures (particularly at temperatures above 550-700° C.). (From 2010 ASME Boiler Pressure Vessel Code, Sec. II, from Tables 1A and 1B, Jul. 1, 2010, New York, N.Y.)

In particular, conventional metallic alloy-based printed circuit heat exchangers are conventionally limited to operating temperatures up to 600° C. At higher temperatures, the mechanical properties of such metallic alloys dramatically degrade as indicated in FIG. 2. In contrast, ceramic and ceramic composite materials described herein have been experimentally shown to be thermally conductive and remain stiff and resistant to deformation at operating temperatures up to 800° C., and it is anticipated that such components will retain their thermal conductivity, stiffness, and strength values well above 800° C.

In order to manufacture thermally-conductive ceramic and ceramic composite components suitable for use in high temperature applications, and in particular having high melting temperatures, high stiffness, and high corrosion resistance, the components are preferably formed to near-net shape and near-net dimensions by a displacive compensation of porosity (DCP) process. Such processes are described in detail in U.S. Pat. Nos. 6,407,022; 6,598,656; and 6,833,337 to Sandhage et al., the contents of which are incorporated herein by reference in their entirety.

Briefly, DCP processes include synthesis or other acquisition of a porous preform with an appropriate composition, pore fraction, and overall shape. The pore fraction of the preform is tailored so that the reaction-induced increase in solid volume can compensate partially or completely for such porosity. It will be understood that the porous preform need only be sufficiently dimensionally stable to resist the capillary action of the infiltrated liquid reactant. The porous preform is infiltrated with a liquid reactant, which can be allowed to react partially or completely with the solid preform to produce a dense, shaped body containing one or more desirable ceramic phases. This reaction is a displacement reaction of the following general type between a liquid species, M(l), and a solid shaped porous preform comprising the compound, $N_BX_C(s)$:

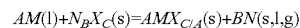

$$AM(l)+N_BX_C(s)=AMX_{C/A}(s)+BN(s,l,g)$$

where $MX_{C/A}(s)$ is a solid reaction product (X is a metalloid element, such as, for example, carbon, boron, oxygen, nitrogen, sulfur, etc.) and N(s,l,g) is a solid or fluid (liquid or gas) reaction product. A, B and C are molar coefficients. Reactions are chosen such that the solid product or products (i.e., BN(s) and/or $MX_{C/A}(s)$) possess a volume that is larger than the solid reactant, $N_BX_C(s)$. Such an increase in solid volume upon reaction is used to fill the prior pore spaces within the starting, shaped, porous $N_BX_C(s)$ preform; that is, the displacement reaction is used to compensate the prior pore volume (Displacive Compensation of Porosity).

The liquid species may be any metal or metals adapted to replace a displaceable species, N, of the solid shaped porous preform comprising the compound, $N_BX_C(s)$. The liquid species may comprise one or more alkaline earth metals, including but not limited to magnesium, calcium, strontium, barium, and mixtures thereof. Alternatively, the liquid species may comprise one or more non-alkaline earth elements, including but not limited to aluminum, chromium, hafnium, niobium, tantalum, titanium, vanadium, zirconium, and mixtures thereof. The liquid species (adapted to replace the displaceable species, N, of the solid shaped porous preform comprising the compound, $N_BX_C(s)$) may be contained within a liquid alloy. The composition of the liquid alloy may be chosen to have a liquidus temperature that is lower than the melting point of the pure metal species M.

The shaped porous preform comprising the compound, $N_BX_C(s)$, may be any material(s) or compound(s) adapted to contain the species to be displaced, including but not limited to carbides, borides, oxides, sulfides, nitrides, and halides.

The DCP process may be used to synthesize a variety of ceramic/metal composite compositions. Composites with a range of ceramic and metal phase compositions may be produced by the DCP process provided that a thermodynamically-favored displacement reaction or reactions is/are utilized, and the volume of the solid product or products formed exceeds the volume of the solid reactant or reactants consumed.

The solid reaction product, $MX_{C/A}(s)$, may be a variety of materials or compounds, including but not limited to carbides, borides, oxides, sulfides, nitrides, halides, and combinations thereof (e.g., compounds, solid solutions, or mixtures of carbonitrides, boronitrides, oxycarbides, oxynitrides, oxysulfides, oxyhalides, etc.). Various nonlimiting examples of the solid reaction product, $MX_{C/A}(s)$, include carbides of aluminum, boron, chromium, hafnium, manganese, molybdenum, niobium, scandium, silicon, tantalum, titanium, tungsten, vanadium, ytterbium, yttrium, and zirconium; borides of cobalt, chromium, hafnium, iron, lanthanum, magnesium, manganese, molybdenum, niobium, neodymium, nickel, rhenium, rhodium, silicon, tantalum, titanium, vanadium, tungsten, yttrium, ytterbium, and zirconium; nitrides of aluminum, boron, cerium, chromium, iron, hafnium, magnesium, manganese, molybdenum, niobium, nickel, silicon, tantalum, tin, titanium, vanadium, tungsten, yttrium, zinc, and zirconium; oxides of aluminum, barium, bismuth, boron, cadmium, calcium, cerium, cesium, chromium, cobalt, copper, indium, iron, hafnium, lithium, magnesium, manganese, molybdenum, niobium, nickel, potassium, silicon, sodium, strontium, tantalum, titanium, vanadium, tungsten, yttrium, and zirconium; and sulfides of aluminum, barium, bismuth, boron, cadmium, cerium, cesium, chromium, cobalt, copper, indium, iron, lanthanum, manganese, molybdenum, niobium, nickel, scandium, titanium, vanadium, tungsten, zinc, and zirconium.

The solid reaction product, N(s), may be selected from the group consisting of metals, metal solid solutions, metal mixtures, and combinations thereof. For instance, the solid reaction product, N(s), may include but is not limited to chromium, cobalt, copper, hafnium, iron, manganese, molybdenum, nickel, niobium, silicon, tantalum, titanium, tungsten, vanadium, yttrium, zirconium, and combinations thereof (e.g., compounds, solid solutions, or mixtures of multiple metals).

Figure 3:
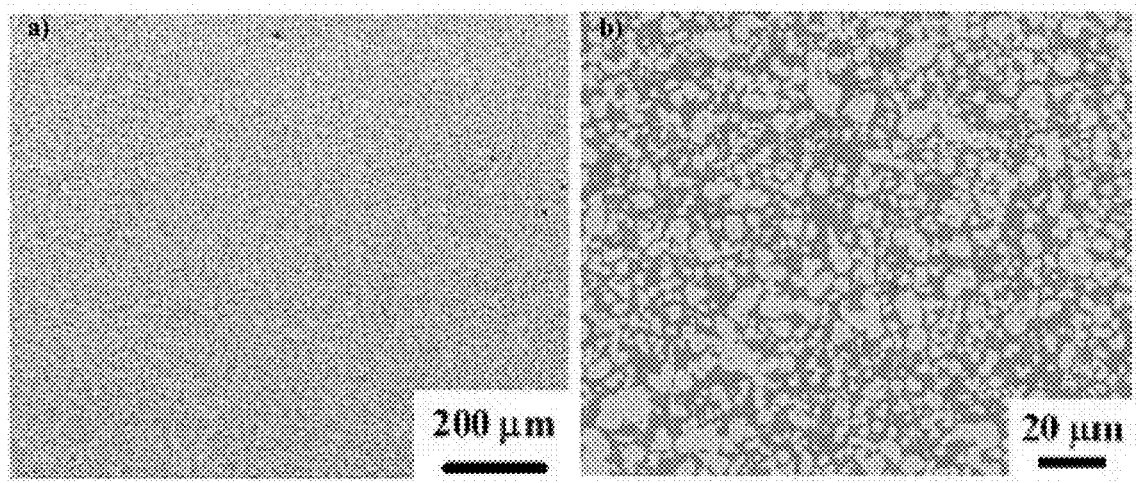
FIG. 3 contains two images of cross-sections of a dense ZrC/W composite prepared by pressureless infiltration of $Zr_2Cu(l)$ into porous WC at 1150° C., then further reactive conversion at 1300° C. (referred to herein as the Displacive Compensation of Porosity process, or DCP process). Image "a" is a low magnification secondary electron image revealing the dense nature of the composite, and image "b" is a higher magnification backscattered electron image revealing a ZrC matrix (darker color) and tungsten (W) particles (lighter color).

FIG. 3 contains two images of cross-sections of a dense zirconium carbide/tungsten (ZrC/W) composite (cermet) material prepared by pressureless infiltration of a $Zr_2Cu(l)$ melt into a porous WC preform at 1150° C., then removed from the melt and allowed to complete the reactive conversion at 1300° C. (DCP process). Image "a" is a low magnification secondary electron image revealing the dense nature of the composite, and image "b" is a higher magnification backscattered electron image of a ZrC matrix (darker color) with tungsten (W) particles (lighter color).

Figure 4:
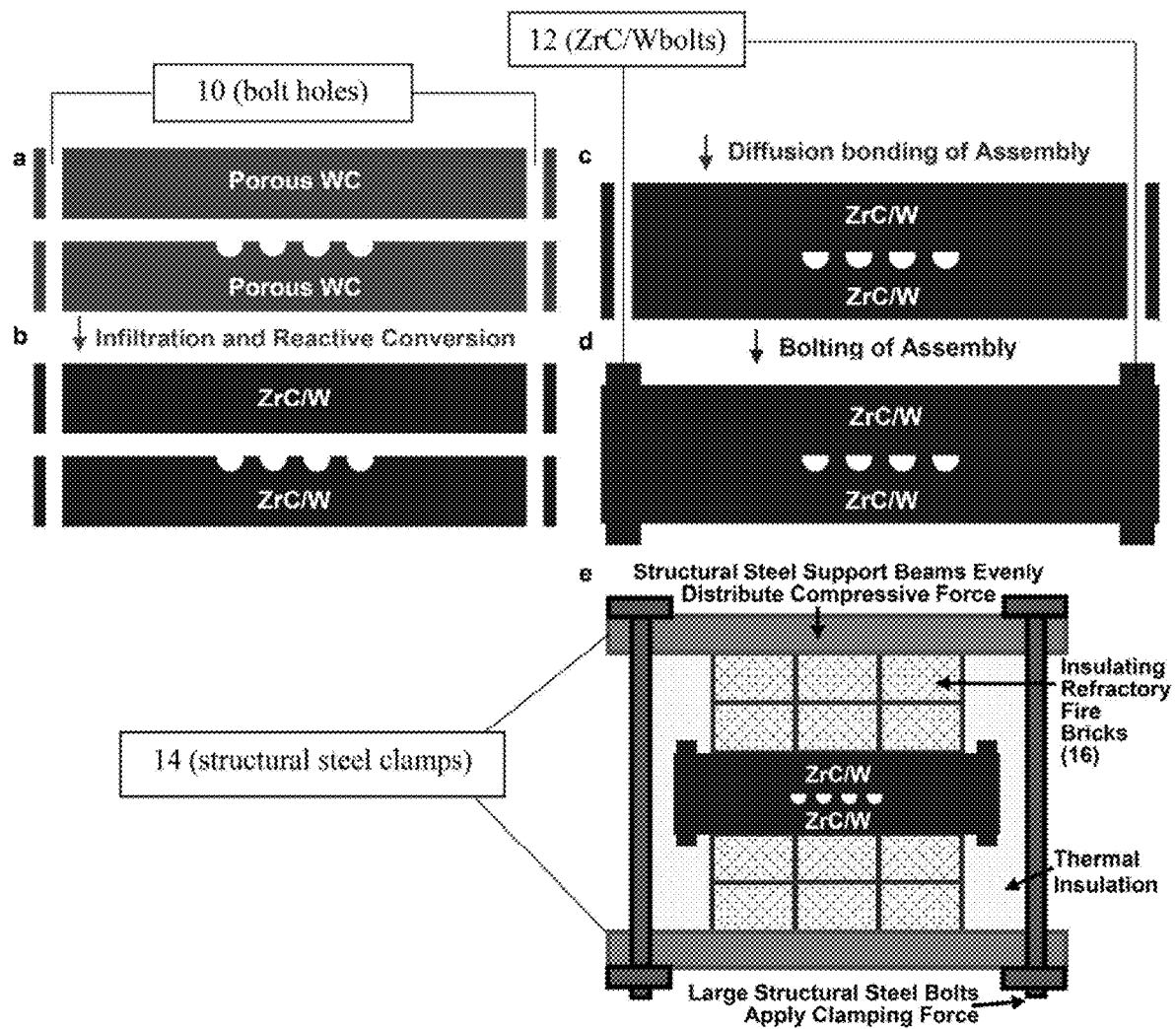
FIG. 4 schematically represents a method of producing components of a diffusion-bonded heat exchanger that entails forming planar WC green bodies with desired surface channels (image a), performing reactive infiltration of Zr—Cu liquid for conversion into dense ZrC/W plates with the same shape, size, and surface channels (image b), diffusion bonding the plates together (image c), bolting the bonded plates (image d), and then clamping the resulting assembly (image e). 10=bolt holes, 12=ZrC/W bolts, 14=clamps comprised of structure steel, 16=thermally-insulating refractory bricks.

In the nonlimiting example of ceramic or ceramic composite components as a replacement for the pattern etched metallic alloy plates in printed circuit heat exchangers, individual plates may be formed by producing a preform pressed into the desired plate shape (for example, pressing with stamped surface channel patterns), converting the preform into ceramic or ceramic composite plates using the shape-preserving DCP process (preferably less than 1% dimensional change), and either simultaneously or subsequently joining pairs of the plates to one another and to headers and tubing of the heat exchanger. FIG. 4 schematically represents a nonlimiting process of manufacturing a diffusion-bonded heat exchanger by forming planar porous WC green bodies with desired surface channels (image a), performing reactive infiltration of Zr—Cu liquid for conversion into dense ZrC/W plates with the same shape, size, and surface channels (image b), diffusion bonding the plates together (image c) to enclose the channels, bolting the bonded plates (image d), and then clamping the resulting assembly (image e). ZrC/W cermet materials offer an attractive and unusual set of properties for heat exchangers. Zirconium carbide (ZrC) and tungsten (W) are ultra-high-melting (3445° C. and 3422° C., respectively), chemically-compatible materials. ZrC and tungsten do not react with each other to form other compounds and, in equilibrium with each other, retain a high solidus (liquid onset) temperature of 2800° C. Remarkably, unlike most cermets, ZrC/W composites are thermally compatible and have similar thermal expansion coefficients, and therefore are resistant to thermal shock. ZrC and W, and composites of ZrC/W, are thermally conductive and electrically conductive.

Once the reactive conversion process is completed to form the individual ZrC/W plates with surface channels or without surface channels, the ZrC/W plates may be coated with a layer of material to enhance the corrosion resistance of the ZrC/W plates or to enhance the subsequent diffusion bonding of the ZrC/W plates together or both. This layer of material may include, but is not limited to, a pure metal, a metal alloy, a ceramic, a ceramic alloy, a metal composite, a ceramic composite, or combinations thereof. The ZrC/W plates coated with a layer of corrosion-resistant material may then be diffusion bonded the plates together (image c of FIG. 4) to enclose the channels, bolting the bonded plates (image d of FIG. 4), and then clamping the resulting assembly (image e of FIG. 4).

Figure 5:
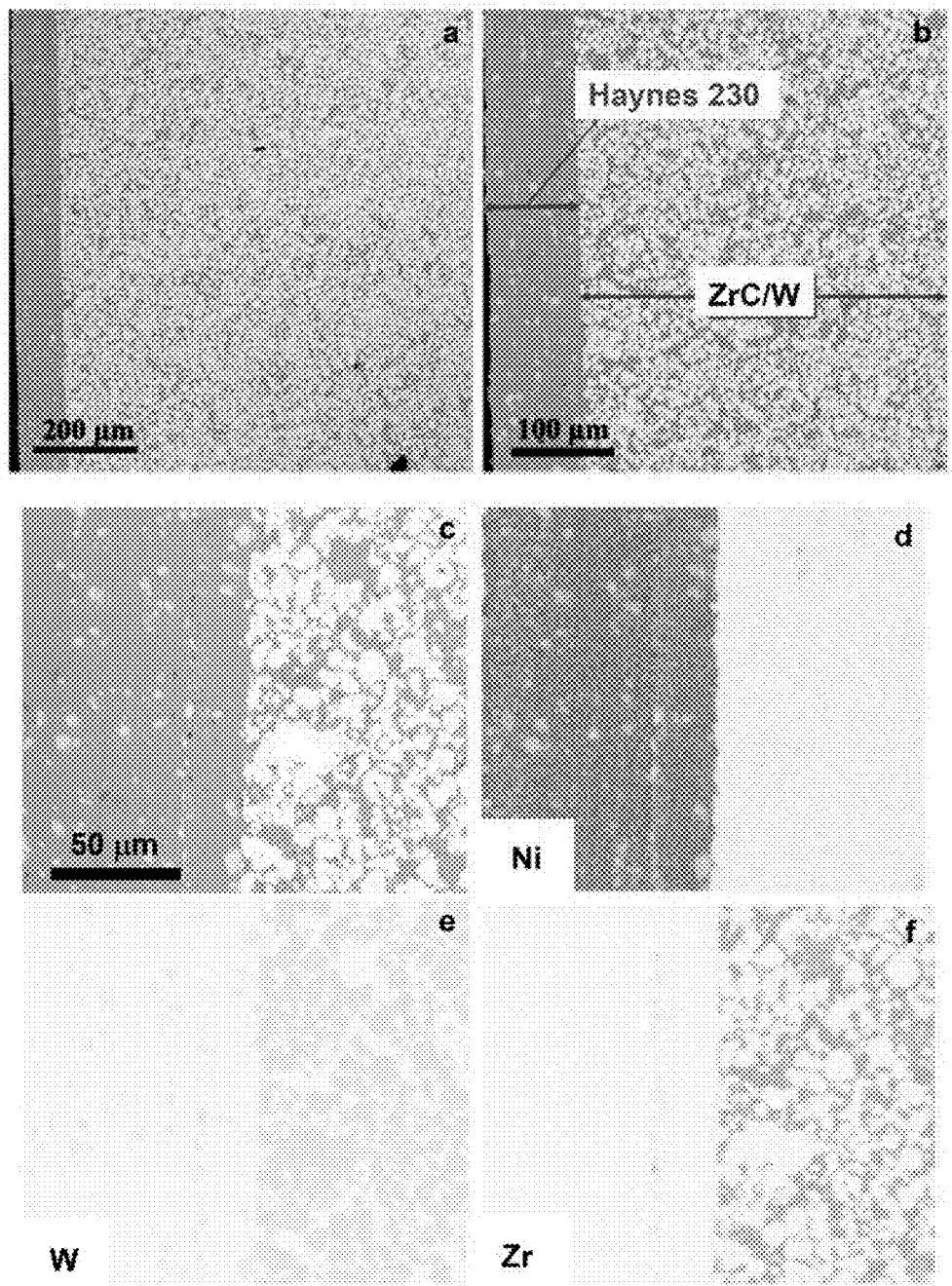
FIG. 5 reveals a ZrC/W composite coated with a corrosion-resistant metal alloy. a)-c) Backscattered electron (BSE) images and elemental maps for: d) Ni, e) W, and f) Zr from a polished cross-section of a ZrC/W composite coated with a Haynes 230 (Ni—Cr—W-based) alloy.

FIG. 5 reveals a ZrC/W composite coated with a corrosion-resistant metal alloy. FIG. 5 a)-c) reveals backscattered electron (BSE) images and elemental maps for: d) Ni, e) W, and f) Zr from a polished cross-section of a ZrC/W composite coated with a corrosion-resistant Haynes 230 (Ni—Cr—W-based) alloy. The Haynes 230 alloy coating was applied to the ZrC/W composite by diffusion bonding of Haynes 230 alloy foil to the ZrC/W composite at a temperature of 920° C. and a pressure of 98 MPa for 2 hours. Prior work (J. Mahaffey, D. Adam, A. Kalra, M. Anderson, K. Sridharan, "Corrosion of Nickel-Based Alloys in Super-critical Carbon Dioxide Environment," pp. 3.19-3.31 in *Proc. EPRI Intl. Conf. Corrosion in Power Plants*, San Diego, Calif. 2015) has shown that exposure of the Haynes 230 alloy to supercritical $CO_2$ at 750° C. and 20 MPa for 1000 h resulted in a weight change of only $1.1 \times 10^{-3}$ mg/mm², due to formation of a continuous thin $Cr_2O_3$ scale, with little Cr loss in the alloy. Hence, the diffusion bonding of such a Haynes 230 alloy foil (or other Ni—Cr-based alloy layers) to ZrC/W composites (as demonstrated in FIG. 5) can be used to endow the ZrC/W composites with enhanced resistance to high-temperature oxidizing environments (such as to supercritical $CO_2$ at elevated temperature and pressure, or to oxygen-bearing atmospheres at elevated temperature and pressure).

ZrC/W plate surfaces, or ZrC/W plates with a corrosion-resistant layer or with a layer to promote diffusion bonding, can be bonded together by heating under pressure in a vacuum hot press. Therefore, prior to applying pressure and heat, the plates may be evacuated with the vacuum hot press to avoid gas entrapment between plates during bonding that might lead to nonconformal bonding of ZrC/W plates. To avoid adhesion of top/bottom platens to the ZrC/W plates, the platens may be coated with a BN powder layer or copper foil.

Subsequent to diffusion bonding, the ZrC/W plates, or ZrC/W plates with a corrosion-resistant layer or with a layer to promote diffusion bonding, may be bolted and/or clamped so as to further promote the mechanical stability of the bonded plates during exposure of the millichannels to a fluid to be flowed therethrough, for example, a mixture of supercritical carbon dioxide ($scCO_2$) and carbon dioxide ($CO_2$) at high temperatures and pressures (for example, about 800° C. and 20 MPa, respectively) if the heat exchanger is to be employed in a $scCO_2$ Brayton cycle. Two nonlimiting approaches include the use of bolts 12 formed of ZrC/W (image "d" of FIG. 4) and/or the use of thermally-isolated clamps 14 comprised of structural steel (image "e" of FIG. 4). In image "a" of FIG. 4, porous WC preform plates have been machined or otherwise formed to have bolt holes 10 that persist after reactive conversion of the preforms into dense ZrC/W plates. After metal coating and bonding, the ZrC/W bolts 12 can be placed in the holes 10 and then tightened to the plates with nuts formed of ZrC/W (image "d" of FIG. 4). Clamps 14 formed of structural steel may also be used to provide additional compression (image e of FIG. 4). To allow for retention of the steel strength, the steel clamps may be thermally isolated from the hot plates through the use of thermally-insulating refractory ceramic bricks 16.

Figure 6:
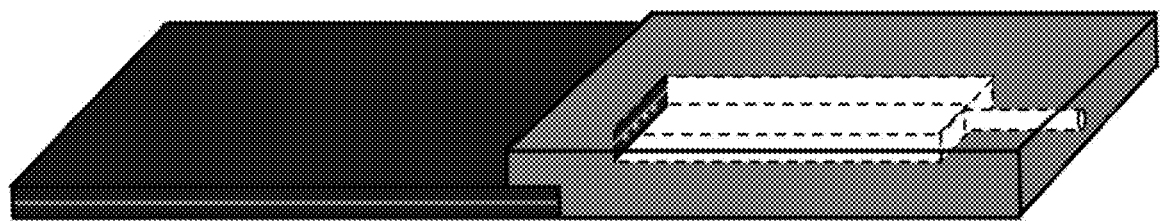
FIG. 6 schematically represents a metal alloy header (right) bonded to a ZrC/W-based heat exchanger (left).

Once the plates have been joined together, the assembled plates may be coupled to headers comprised of high-temperature metal alloys (e.g., IN625, IN800H) which, in turn, will be joined to thick-walled tubes of such alloys (for connection to the rest of a $scCO_2$ Brayton cycle infrastructure). FIG. 6 represents a metal alloy header (in blue) bonded on a top surface (via an overhang) and end edge of a ZrC/W-based heat exchanger comprising two ZrC/W plates joined together as described herein. Although not shown, such a header may be bonded to both ends of the heat exchanger (e.g., input and output). Each header contains an internal cavity to provide $scCO_2$ access to/from all of the millichannels in the heat exchanger. The cavity may be connected to a cylindrical port for connection to a metal alloy tube. The headers may be prepared in two halves, with one of the halves machined to contain the cavity and cylindrical port, and then diffusion bonded together.

DCP processes of the types described above provide cost-effective methods for fabricating net-shape and net-size ceramic composites, for example, without the sintering shrinkage encountered in conventional ceramics processing and without the need for appreciable costly machining, or chemical etching of metallic alloys. The resulting components may be thermally conductive, may have high melting temperatures, and may be mechanically, thermally, and chemically robust. As such, when used in high-temperature systems, ceramic or ceramic composite components formed by DCP processes as described above are capable of providing significant advantages over conventional high-temperature metallic alloys or ceramic composites made by conventional methods. Cycle turbine inlet conditions of printed circuit heat exchangers are currently limited to about 550° C. at 20 MPa due to degradation in the mechanical behavior of conventional metal alloys at temperatures greater than about 600° C. By allowing for operation at inlet temperatures of 800° C. or more, it is expected that heat exchangers as described herein will enable an increase in the power cycle efficiency from about 40% to about 55% at a materials cost of less than that of conventional structural metal alloys.

From the foregoing, it should be appreciated that, according to one aspect of the invention, a thermally-conductive ceramic or ceramic composite component for a high temperature system can be prepared by reacting a fluid comprising at least one displacing metal (liquid species, M(l)) and a rigid, porous preform (compound, $N_BX_C(s)$) having a pore volume and comprising at least one displaceable species, wherein the displacing metal is capable of displacing the displaceable species. The fluid is allowed to infiltrate the preform such that the displacing metal at least partially replaces the displaceable species, so as to at least partially fill the pore volume and thereby produce the ceramic or ceramic composite component. The resulting component has a ceramic portion having a volume greater than the volume of the ceramic lost from the preform from which the displaceable species is displaced.

Preferred embodiments of the present invention include compact millichanneled heat exchangers comprising high-temperature composite materials having heat transfer capabilities suitable for use in $scCO_2$ cycles at 800° C. or more. The ceramic or ceramic composite components used in the heat exchangers are thermally conductive and have high melting temperatures and are comprised of materials with similar thermal expansion coefficients. Such components have been demonstrated to be highly-resistant to thermal shock and to exhibit strengths (>350 MPa) that are invariant from about 25° C. to about 800° C. The phases within these components are either known to be resistant to corrosion by fluids at high temperatures or are expected to be so on the basis of thermodynamic calculations or may be coated with a layer of a corrosion-resistant material. Such high-temperature fluids include but are not limited to molten metals, molten salts (such as molten chlorides and molten fluorides), and gases (such as helium and argon).

Nonlimiting embodiments of the invention will now be described in reference to experimental investigations leading up to the invention.

Dense, channeled ZrC/W plates were fabricated by DCP processes of the types noted above. Specifically, tungsten carbide (WC) preform plates with dimensions of 3.5 cm×3.5 cm×1.2 cm, and with two straight millichannels (6.1 mm wide channels with a semi-circular cross-section), were directly formed via uniaxial pressing of mixtures of tungsten carbide (WC) with an ammonium acetate binder. Such pressing was conducted using a 1018 (low-carbon) steel die set with a ram possessing a surface machined in the negative geometry of the desired semi-circular channels. Mixtures of WC powder with about 5.3 wt. % ammonium acetate binder were pressed with the die set at a peak pressure of 36 MPa. The ram was then pulled off the WC/ammonium acetate mixture, generating millichanneled, plate-shaped WC/binder green bodies with smooth surfaces and sharp edges.

Figure 7:
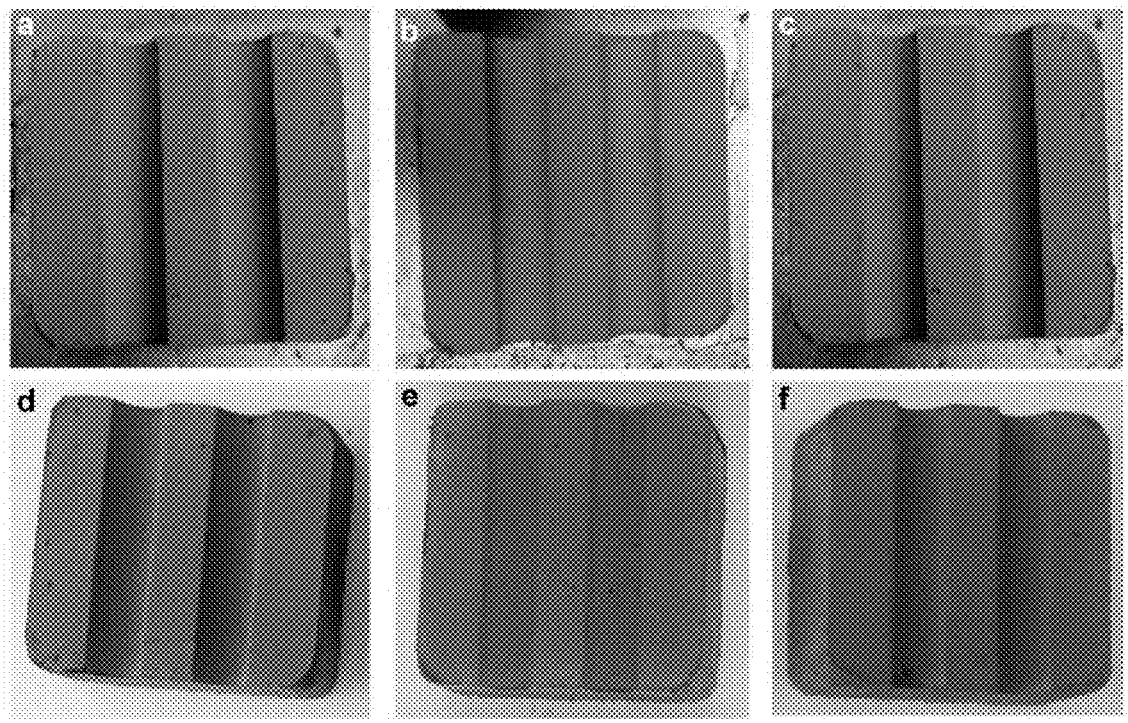
FIG. 7 contains six images that include square-shaped (3.5 cm edge) WC/binder-bearing preforms formed to have surface channels and prepared by uniaxial pressing with a patterned ram (images a, b, and c), and the same preforms after binder evaporation and then sintering at 1400° C. for four hours (images d, e, and f).

The green bodies were heated at 1° C./min in an $O_2$-scrubbed argon atmosphere to 160° C., held at this temperature for four hours (to complete binder evaporation) and then heated in $O_2$-scrubbed argon at 2° C./min to 1400° C. for four hours (for WC particle necking to rigidify the preforms). Images of three pressed millichanneled WC/binder preforms, and the same samples after binder burnout and light sintering, are shown in FIG. 7. The fired millichanneled WC bodies possessed bulk porosity values of 58.1%, 53.8%, 57.6%, and 57.0% (i.e., in a desired 53±5% range).

Figure 8:
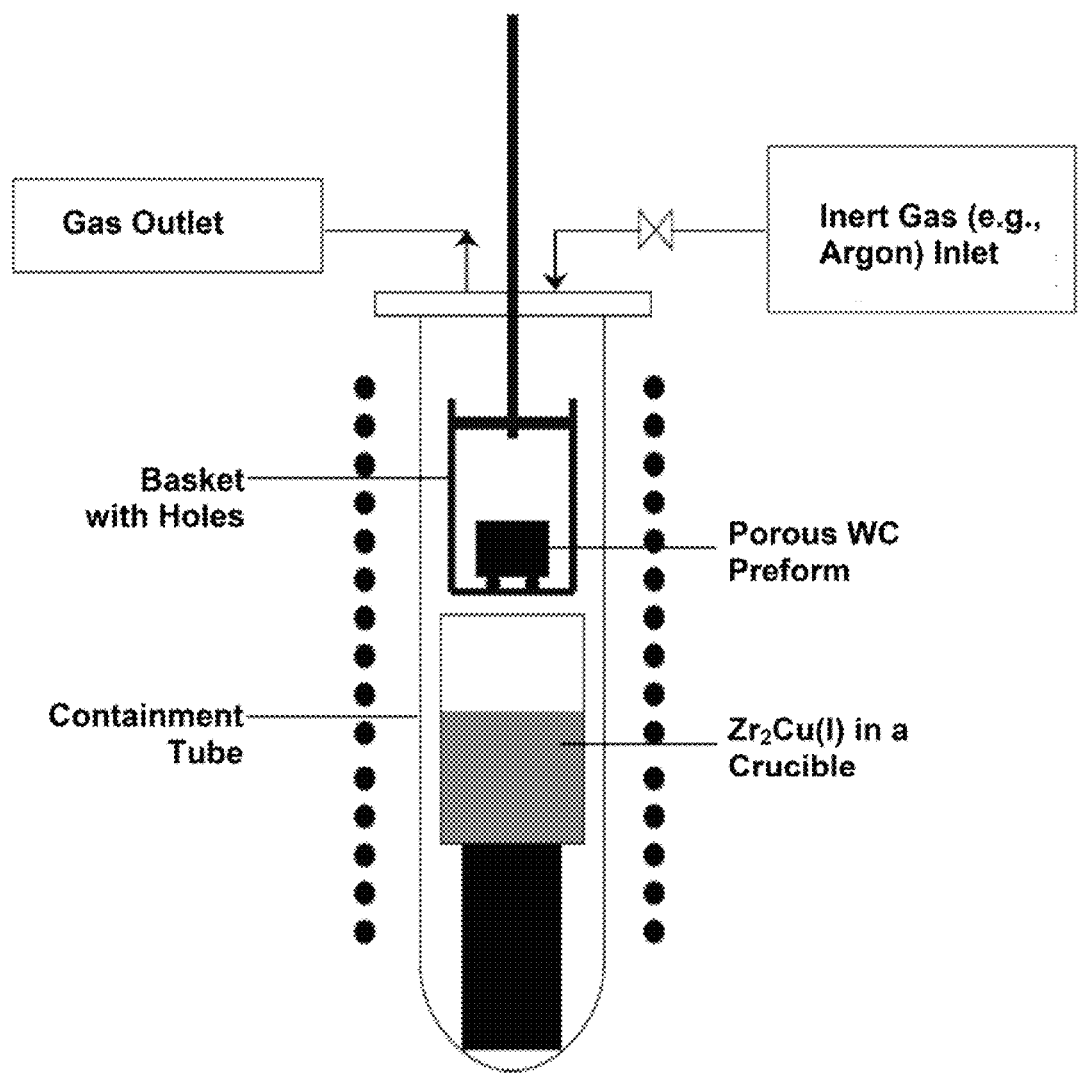
FIG. 8 schematically represents a nonlimiting hot wall, inert atmosphere melt infiltration reactor comprising a vertical rod, connected to a basket (with holes therethrough) containing a shaped, porous WC preform, for raising and lowering the porous WC preform into a $Zr_2Cu$ melt bath located within a stationary crucible. The porous WC preform and the $Zr_2Cu$ melt bath are contained within an inert atmosphere vertical containment tube.

The porous, two-channel WC preforms were converted into dense-wall ZrC/W replicas using a controlled atmosphere, hot-wall (containment tube enclosed) melt infiltration system schematically represented in FIG. 8. For a given experiment, a porous WC preform was placed vertically inside a basket into which several through-holes had been drilled to allow for the inflow of molten $Zr_2Cu$ (image "a" of FIG. 9). The preform-containing basket was positioned above a $Zr_2Cu$-bearing crucible (FIG. 8). Prior to reactive infiltration, the atmosphere within the sealed mullite tube was evacuated and backfilled three times with high-purity, $O_2$-scrubbed argon. After heating the WC preform and $Zr_2Cu$ to 1125° C., the WC-bearing basket was slowly lowered (0.15 mm/s) into the melt to allow for $Zr_2Cu(l)$ migration through the holes into the basket to gradually immerse the WC preform in the molten $Zr_2Cu$.

Figure 9:
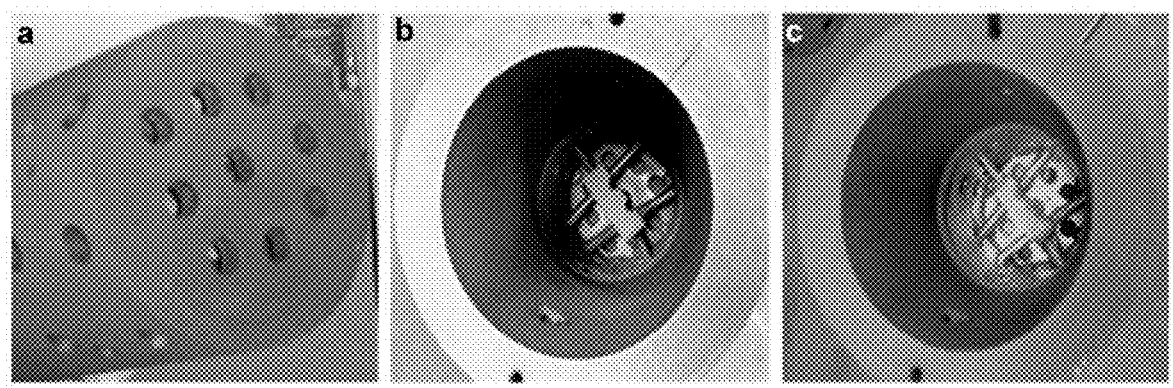
FIG. 9 contains three images that show an experimental setup in a system of the type represented in FIG. 8. Image "a" shows an exterior surface of a bottom of a basket for containing a preform and having holes to allow a melt to enter an interior of the basket. Images "b" and "c" show a 3.5 cm×3.5 cm×1.3 cm porous WC preform with two millichannels (of the type represented in FIG. 10) positioned on rods in the interior of the basket of image "a" before (image "b") and after (image "c") infiltration and reaction with $Zr_2Cu(l)$.
Figure 10:
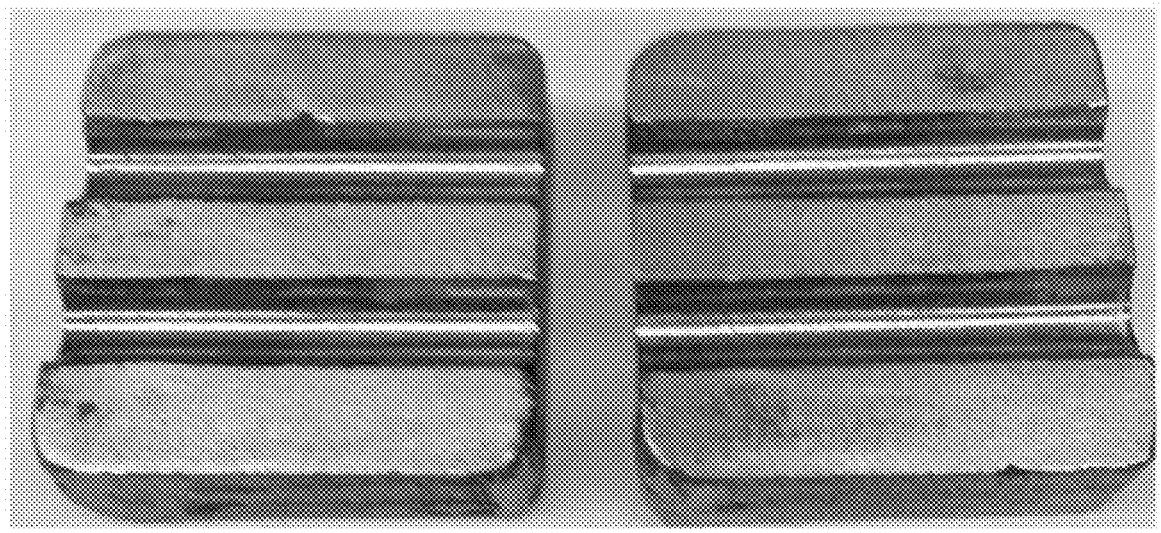
FIG. 10 is an image of two ZrC/W plates each with two continuous millichannels generated by pressureless infiltration (at 1125° C. for 15 min) of porous WC preforms in, and reaction (at 1300° C. for 2 h) of such porous WC preforms with $Zr_2Cu(l)$.
Figure 11:
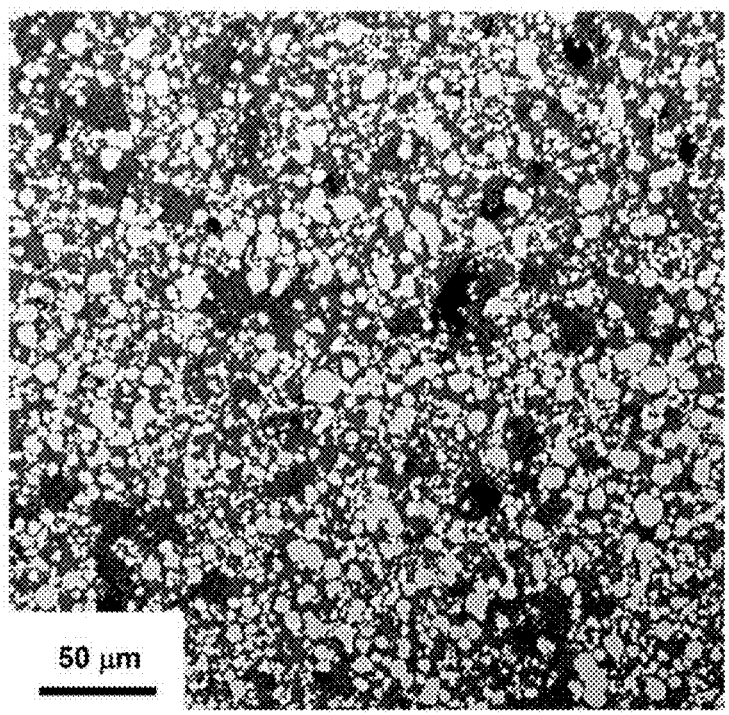
FIG. 11 is a backscattered electron (BSE) image of a cross-section of one of the ZrC/W plates of FIG. 10.
Figure 12:
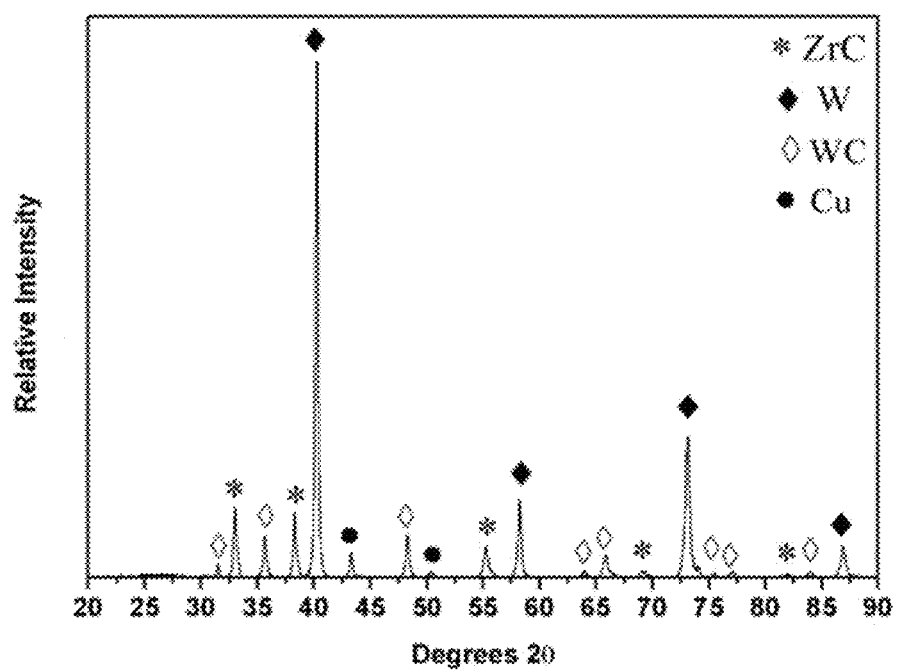
FIG. 12 is an X-ray diffraction (XRD) pattern from a cross-section of one of the ZrC/W plates of FIG. 10.

After twenty minutes of immersion, the basket was raised out of the melt to allow excess molten metal to drain from the infiltrated preform. The furnace was then heated to 1300° C. and held at this temperature for two hours to allow for further reaction of the infiltrated melt with residual WC inside the preform. After cooling to room temperature within the $O_2$-scrubbed argon atmosphere, the specimen was removed from the furnace. are Images "b" and "c" of FIG. 9 show, respectively, optical images of a porous WC plate (standing on edge) with two millichannels positioned (on rods) within the basket before and after infiltration/reaction with $Zr_2Cu(l)$. Optical images of two ZrC/W plates with two continuous millichannels generated by such pressureless infiltration of, and reaction with, $Zr_2Cu(l)$ are shown in FIG. 10. The shapes and dimensions of these millichanneled ZrC/W plates were well preserved after such reactive conversion. As shown in Tables 1 and 2, the changes in dimensions for five such millichanneled plates after conversion into ZrC/W were less than about one percent. FIGS. 11 and 12 are backscattered electron (BSE) image and an X-ray diffraction (XRD) pattern, respectively, of a cross-section of one of the ZrC/W plates of FIG. 10.

TABLE 1

| Sample | WC Length (cm) | WC Width (cm) | WC Thickness (cm) | ZrC/W Length (cm) | ZrC/W Width (cm) | ZrC/W Thickness (cm) |
|---|---|---|---|---|---|---|
| 1 | 3.472 | 3.472 | 1.223 | 3.470 | 3.448 | 1.216 |
| 2 | 3.471 | 3.471 | 1.292 | 3.445 | 3.445 | 1.281 |
| 3 | 3.472 | 3.471 | 1.242 | 3.465 | 3.448 | 1.240 |
| 4 | 3.471 | 3.471 | 1.230 | 3.435 | 3.436 | 1.228 |
| 5 | 3.475 | 3.475 | 1.253 | 3.454 | 3.452 | 1.249 |

TABLE 2

| Sample | Length Change (%) | Width Change (%) | Thickness Change (%) |
|---|---|---|---|
| 1 | −0.06 | −0.69 | −0.57 |
| 2 | −0.75 | −0.75 | −0.85 |
| 3 | −0.2 | −0.66 | −0.16 |
| 4 | −1.04 | −1.01 | −0.16 |
| 5 | −0.60 | −0.66 | −0.32 |

Polished cross-sections (both parallel and perpendicular to the millichannels) of these reactively-converted ZrC/W specimens were prepared for X-ray diffraction (XRD) and scanning electron microscope (SEM) analyses of the phase content and density/porosity of such specimens. Image analyses of four different areas (two from sections parallel to the channels and two from sections perpendicular to the channels) of each specimen yielded the porosity data shown in Table 3.

TABLE 3

| Sample | Relative Porosity (%) | Relative Density (%) | Average Pore Size (μm) |
|---|---|---|---|
| 1 | 3.26 | 96.74 | 8.5 |
| 2 | 3.21 | 96.79 | 7.4 |
| 3 | 3.23 | 96.77 | 5.8 |
| 4 | 3.15 | 96.85 | 6.4 |
| 5 | 3.09 | 96.91 | 5.9 |
| Average | 3.19 ± 0.10 | 96.81 ± 0.10 | 6.8 ± 1.7 |

The average bulk porosity was only 3.2% (for a relative density of 96.8%), with pores ranging in size from a few microns to about 30 microns and with an average pore size of 6.8 μm. X-ray diffraction analyses yielded predominant diffraction peaks for tungsten and ZrC, with minor peaks for unreacted WC and residual (trapped) Cu. The phase content and extent of reaction were determined by considering the reaction:

$$(a/2)Zr_2Cu(l)+WC(s) \rightarrow aZrC(s)+aW(s)+(1-a)WC(s)+bCu(s)+[(a/2)-b]\{Cu\} \quad (1)$$

where {Cu} refers to molten copper ($T_m$=1085° C.) that had been extruded out of the reacted specimen at 1150-1300° C. due to the filling of prior pores with the solid reaction products (W+ZrC), and Cu(s) refers to the copper remaining in the sample. The values of the parameters a and b in reaction (1) for a given ZrC/W specimen have been unambiguously determined from: i) evaluation of the W:WC peak area ratio (for the (110) tungsten peak at 2θ=40.3° and the (100) WC peak centered at 2θ=35.6°), which yielded the ratio of a/(1−a) by reference to a X-ray diffraction calibration curve, and ii) from the weight gain, ΔW/Wo, upon reactive infiltration. With the value of "a" determined from calibrated XRD analyses, the value of b was obtained from the measured value of ΔW/Wo using the following equation:

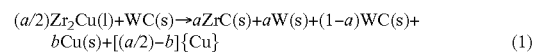

$$\frac{\Delta W}{W_0} = \frac{\{[a \cdot MW_{ZrC} + a \cdot AW_W + (1-a) \cdot MW_{WC} + b \cdot AW_{Cu}] - MW_{WC}\}}{[MW_{WC}]}$$

where $MW_i$ and $AW_i$ refers to the molecular weight and atomic weight, respectively, of species I.

Such phase analysis of one of the five converted millichanneled ZrC/W plates was completed. X-ray diffraction analyses of four different cross-sections (two parallel and two perpendicular to the millichannels) of this specimen yielded four sets of a and b values that were used, along with the value of W/Wo for this specimen, to calculate the extent of reaction (W:[W+WC] mole ratio) and phase content. The phase content was then used to calculate the theoretical density of the composite specimen which, when compared to separate experimental measurement of the specimen bulk density (=11.20 g/cm$^3$, via measurements of the specimen volume, by Archimedes method, and the specimen dry weight), yielded values of the relative density and porosity. Such phase analyses for a single millichanneled ZrC/W plate are shown in Tables 4 and 5. The average value for the extent of reaction for this specimen (94.0%) was within the desired range (92±5%).

TABLE 4

| Analysis No. | W:WC (mole ratio) | $^\Delta$W/W0 (%) | Rxn Extent [W:W + WC] (%) |
|---|---|---|---|
| 1 (parallel) | 20.28 | 47.862 | 95.30 |
| 2 (perpendicular) | 16.45 | 47.862 | 94.27 |
| 3 (parallel) | 11.02 | 47.862 | 91.68 |
| 4 (perpendicular) | 18.00 | 47.862 | 94.74 |
| Average | 16.44 ± 3.94 | 47.862 | 94.00 ± 1.60 |

TABLE 5

| Analysis No. | Phase Content (vol. %) | | | | Density [Theo.] (g/cm$^3$) | Porosity (%) |
|---|---|---|---|---|---|---|
| | ZrC | W | WC | Cu | | |
| 1 (parallel) | 58.36 | 36.25 | 2.36 | 3.03 | 11.56 | 3.14 |
| 2 (perpendicular) | 57.78 | 35.88 | 2.88 | 3.46 | 11.57 | 3.22 |
| 3 (parallel) | 56.32 | 34.98 | 4.18 | 4.52 | 11.60 | 3.43 |
| 4 (perpendicular) | 58.05 | 36.05 | 2.64 | 3.27 | 11.57 | 3.18 |
| Average | 57.63 ± 0.90 | 35.79 ± 0.56 | 3.01 ± 0.81 | 3.57 ± 0.66 | 11.58 ± 0.02 | 3.24 ± 0.13 |

The DCP-derived ZrC/W plates were evaluated to determine their viability for use in heat exchangers. Thermal diffusivity, heat capacity, and thermal conductivity values were obtained (Table 6) for DCP-derived ZrC/W composite samples at 800° C. using laser flash analyses (as per ASTM E1461) and differential scanning calorimetry (as per ASTM E1269). Average and standard deviation values of the thermal conductivity at 800° C. were found to be 66.0 W/m-K and 6.9 W/m-K, respectively. T-test analysis yielded a 95% confidence limit range of 60.7 to 71.3 W/m-K. It is worth noting that the thermal conductivity of ZrC/W at 800° C. (66±6.9 W/m-K) was greater than 2.7 times higher than for H230 and Inconel 740H alloys at this temperature. Such dramatically higher thermal conductivity for ZrC/W at 800° C. compared to Haynes 230, Inconel 740H, and other Ni-based alloys at this temperature has not previously been reported and is a remarkable and non-obvious observation.

TABLE 6

| Sample | Diffusivity (cm$^2$/s) | Heat Capacity (J/g-K) | Density (g/cm$^3$) | Thermal Conductivity (W/m-K) |
|---|---|---|---|---|
| 1 | 0.211 | 0.309 | 11.40 | 74.3 |
| 2 | 0.207 | 0.311 | 11.40 | 73.4 |
| 3 | 0.210 | 0.311 | 11.40 | 74.5 |
| 4 | 0.187 | 0.274 | 11.54 | 59.1 |
| 5 | 0.179 | 0.273 | 11.54 | 56.4 |
| 6 | 0.185 | 0.276 | 11.54 | 58.9 |
| 7 | 0.211 | 0.266 | 11.59 | 64.8 |
| 8 | 0.204 | 0.273 | 11.59 | 64.5 |
| 9 | 0.214 | 0.274 | 11.59 | 68.0 |
| Average | 0.201 | 0.285 | 11.51 | 66.0 |
| Standard Deviation | 0.013 | 0.019 | 0.085 | 6.9 |

The average fracture strength of DCP-derived ZrC/W composites was obtained via four point bend tests conducted at 800° C. DCP-derived ZrC/W composite discs (5 cm dia.) were cut by electrodischarge machining (EDM) into bars, and then ground and chamfered into four point bend test specimens with dimensions of 2 (±0.05)×1.5 (±0.05)×25 mm so as to conform to the ASTM C1211-13 standard. The bend test specimens were thermally cycled between room temperature and 800° C. at a heating rate of 10° C./min and a cooling rate of greater than 10° C./min for 10 cycles in flowing O$_2$-gettered argon.

The test specimens were loaded onto the test fixture at room temperature. The furnace chamber was then evacuated and backfilled three times with H$_2$(4%)/argon gas. The temperature was then raised from room temperature to 800° C. at a rate of 10° C./min under constant H$_2$(4%)/argon gas flow. An increasing force was then applied and measured continuously to the point of specimen failure. The fracture strength was calculated using the following equation.

$$\sigma_F = 3PL/(4bd^2)$$

with P=break force; L=outer span length; b=specimen width; d=specimen thickness.

Table 7 shows the fracture strength, $\sigma_F$, of the ten tested specimens. T-test analysis was conducted using a target $\sigma_F$ value of 369.4 MPa (the average fracture strength previously obtained in four point bending tests at 800° C. for non-thermally-cycled specimens). The resulting p value was 0.015, which indicated that the experimental $\sigma_F$ values for the thermally-cycled specimens were statistically different from, and above, the $\sigma_F$ values for the non-thermally-cycled specimens. It is worth noting that the average strength values shown in Table 7 for DCP-derived ZrC/W composites at 800° C. are dramatically higher than the maximum allowed stresses for stainless steels and nickel-based superalloys at this temperature according to the 2010 ASME Boiler Pressure Vessel Code. Such maximum allowed stresses for a variety of stainless steels and nickel-based superalloys are shown in FIG. 2.

TABLE 7

| Sample | Fracture Strength (MPa) |
|---|---|
| 1 | 346.1 |
| 2 | 397.0 |
| 3 | 372.4 |
| 4 | 389.2 |
| 5 | 406.7 |
| 6 | 410.5 |
| 7 | 361.3 |
| 8 | 407.8 |
| 9 | 404.6 |
| 10 | 378.1 |

The data shown in Tables 6 and 7 indicate a remarkable combination of high-temperature thermal and mechanical properties for ZrC/W, which are well in excess of the combination of thermal and mechanical properties for conventional stainless steels and nickel-based metal alloys, for use in high-temperature devices and systems that require high thermal conductivity with robust mechanical behavior.

These investigations demonstrated that DCP-derived plates of dense ZrC/W can be generated with channels of tailorable shape and size. Such channeled ZrC/W plates may then be coated with a corrosion-resistant material. Such channeled ZrC/W plates, or ZrC/W plates coated with a corrosion-resistant material, may be bonded (e.g., by diffusion bonding at elevated temperature and pressure) to flat ZrC/W plates or to flat ZrC/W plates coated with a corrosion-resistant material to yield ZrC/W heat exchangers with internal channels with tailorable patterns or to yield ZrC/W heat exchangers with internal channels with tailorable patterns with the internal channels coated with a corrosion-resistant material.

While the invention has been described in terms of specific or particular embodiments and investigations, it should be apparent that alternatives could be adopted by one skilled in the art. For example, the thermally-conductive components could be formed of materials other than those noted and could be used in high-temperature applications other than those described, systems other than those noted could be used to perform the DCP process, and process parameters such as temperatures and durations could be modified. Accordingly, it should be understood that the invention is not necessarily limited to any embodiment described herein or illustrated in the drawings. It should also be understood that the phraseology and terminology employed above are for the purpose of describing the disclosed embodiments and investigations, and do not necessarily serve as limitations to the scope of the invention. Therefore, the scope of the invention is to be limited only by the following claims.

The invention claimed is:

1. A thermally-conductive ceramic or ceramic composite component for a high temperature system, the component prepared by a method comprising:
    providing a preform having surface channels in at least a first surface thereof, a pore volume, and a ceramic volume that comprises at least one displaceable species;
    providing a fluid comprising at least one displacing metal capable of displacing the at least one displaceable species to produce at least one ceramic reaction product volume; and
    allowing the fluid to infiltrate the preform and react with the preform such that the at least one displacing metal at least partially replaces the at least one displaceable species to produce the at least one ceramic reaction product volume, the pore volume is at least partially filled by the at least one ceramic reaction product volume, the component has the surface channels formed at least partially by the at least one ceramic reaction product volume, and the component comprises a ceramic reaction volume portion having a volume greater than the ceramic volume lost by reaction of the preform from which the at least one displaceable species is displaced; and
    wherein the component is more thermally conductive than the preform with the pore volume; and
    wherein the component is a ceramic/metal composite and the metal of the ceramic/metal composite is a metal, a metal solid solution, a metal mixture, or any combination thereof chosen from the group consisting of cobalt, copper, hafnium, iron, manganese, nickel, silicon, titanium, vanadium, yttrium, zirconium, or any combination thereof.

2. The thermally-conductive component of claim 1, wherein the component is a plate having the surface channels thereon, and the method further comprises joining the component to a second ceramic or ceramic composite plate-shaped component.

3. The thermally-conductive component of claim 1, wherein the component is coated with a layer of a corrosion-resistant material.

4. The thermally-conductive component of claim 3, wherein the layer of corrosion-resistant material comprises a pure metal, a metal alloy, a ceramic, a ceramic alloy, a metal composite, a ceramic composite, or any combination thereof.

5. The thermally-conductive component of claim 1, wherein the component is coated with a layer of a material that enhances diffusion bonding of the component to a second ceramic or ceramic composite component.

6. The thermally-conductive component of claim 1, wherein the preform is a plate having the surface channels thereon, and the method further comprises joining the component to a second ceramic or ceramic composite plate-shaped component to form a plate assembly with the surface channels enclosed therebetween, providing a header on at least one edge of the plate assembly, and with the header fluidically coupling the surface channels to a component of a heat exchanger.

7. The thermally-conductive component of claim 1, wherein the ceramic of the ceramic/metal composite is a compound, solid solution, or mixture chosen from the group consisting of an oxide, a sulfide, a halide, or any combination thereof.

8. The thermally-conductive component of claim 1, wherein:
    the ceramic of the ceramic/metal composite is a compound, solid solution, or mixture chosen from the group consisting of a carbide, a boride, a sulfide, a nitride, or a halide;
    the preform is formed by pressing a mixture of the ceramic volume and a binder and then sintering the mixture in an oxygen-scrubbed atmosphere to rigidify the preform; and
    the preform is infiltrated with the fluid in an oxygen-scrubbed atmosphere.

9. The thermally-conductive component of claim 1, wherein the surface channels are entirely contained in the first surface.

10. A thermally-conductive ceramic or ceramic composite component for a high temperature system, the component prepared by a method comprising:
    providing a preform having surface channels in at least a first surface thereof, a pore volume, and a ceramic volume that comprises at least one displaceable species;
    providing a fluid comprising at least one displacing metal capable of displacing the at least one displaceable species to produce at least one ceramic reaction product volume; and
    allowing the fluid to infiltrate the preform and react with the preform such that the at least one displacing metal at least partially replaces the at least one displaceable species to produce the at least one ceramic reaction product volume, the pore volume is at least partially filled by the at least one ceramic reaction product volume, the component has the surface channels formed at least partially by the at least one ceramic reaction product volume, and the component comprises a ceramic reaction volume portion having a volume greater than the ceramic volume lost by reaction of the preform from which the at least one displaceable species is displaced; and wherein the component is more thermally conductive than the preform with the pore volume; and wherein the component is a ceramic/metal composite and the ceramic of the ceramic/metal composite is a compound, solid solution, or mixture chosen from the group consisting of an oxide, a sulfide, a halide, or any combination thereof.

11. The thermally-conductive component of claim 10, wherein the preform is a plate having the patterned channels thereon, and the method further comprises joining the component to a second ceramic or ceramic composite plate-shaped component.

12. The thermally-conductive component of claim 10, wherein the component and the second component are joined by depositing a layer of a material on a surface on each of the components that enhances diffusion bonding of the component to a second ceramic or ceramic composite component, or by depositing a corrosion-resistant layer on a surface on each of the components, and then diffusion bonding the surfaces comprising the metallic coatings.

13. The thermally-conductive component of claim 10, wherein the metal of the ceramic/metal composite comprises one or more of a metal, a metal solid solutions, a metal mixture, or any combination thereof of one or more of chromium, cobalt, copper, hafnium, iron, manganese, molybdenum, nickel, niobium, silicon, tantalum, titanium, tungsten, vanadium, yttrium, zirconium, or any combination thereof.

14. The thermally-conductive component of claim 10, wherein the preform comprises one or more of the carbides of chromium, molybdenum, titanium, tungsten or one or more of the borides of chromium, molybdenum, titanium, or tungsten and the fluid is a liquid comprised of one or more of titanium, zirconium, or hafnium and one or more of copper, tin, nickel, cobalt, iron, lead, bismuth, manganese, cadmium, indium.

* * * * *